United States Patent [19]

Hunt, Jr.

[11] 3,888,011
[45] June 10, 1975

[54] MEASURING DEVICES AND METHODS OF MAKING AND USING THE SAME

[76] Inventor: Loran D. Hunt, Jr., 7493 Hazelcrest Dr., Hazelwood, Mo. 63043

[22] Filed: Oct. 12, 1973

[21] Appl. No.: 405,776

[52] U.S. Cl. ............... 33/126.5; 33/139; 74/805; 242/84.1 J
[51] Int. Cl. ....... G01b 3/00; G01f 23/04; F16h 1/28
[58] Field of Search ....... 33/126.5, 126.6, 138, 139, 33/140, 141 R, 141 B; 73/321; 242/84.1 J; 74/804, 805

[56] References Cited
UNITED STATES PATENTS

| | | | |
|---|---|---|---|
| 475,630 | 5/1892 | Stull | 33/139 |
| 2,489,614 | 11/1949 | Brikoff | 242/84.1 J |
| 2,884,815 | 5/1959 | Pittman, Jr. | 74/804 |
| 3,498,561 | 3/1970 | Smith | 242/84.1 J |

Primary Examiner—Samuel B. Rothberg
Assistant Examiner—Steven L. Stephan
Attorney, Agent, or Firm—Roger M. Hibbits

[57] ABSTRACT

A measuring device comprising a housing provided with a chamber therein, reel means rotatably mounted within said chamber, rotation multiplication means mounted in said chamber and operably coupled to said reel means, and indicating means operably coupled to said rotation multiplication means.

4 Claims, 8 Drawing Figures

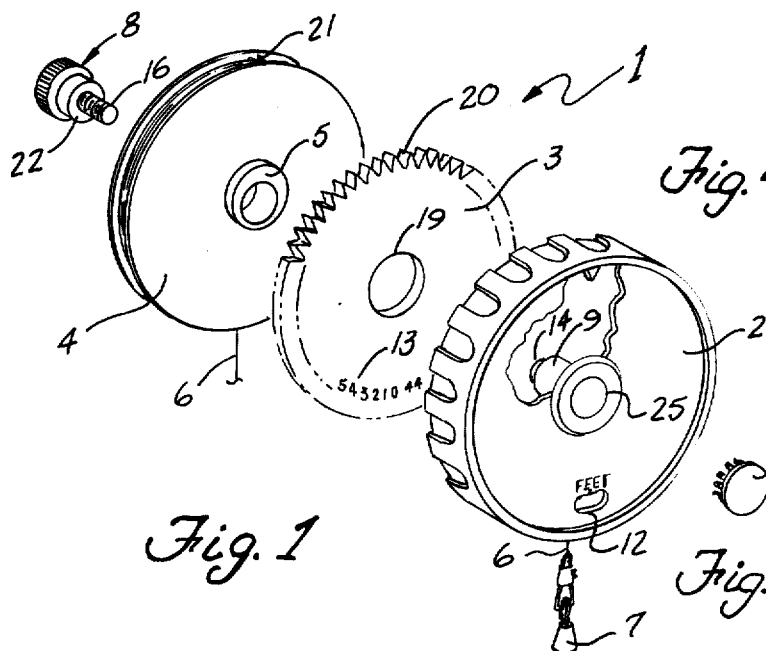
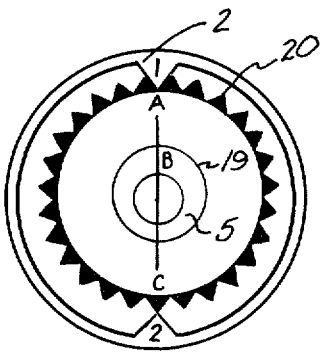
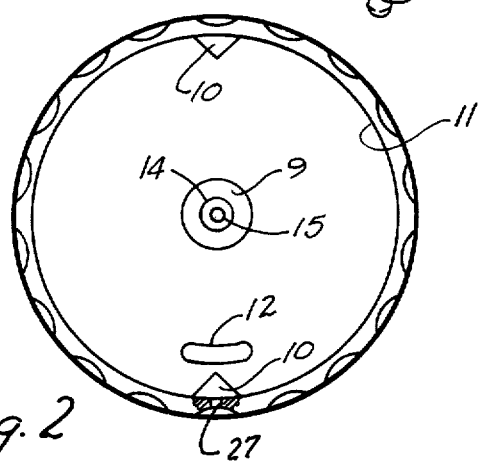
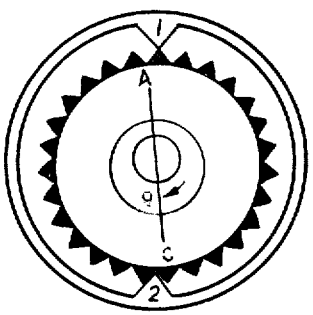
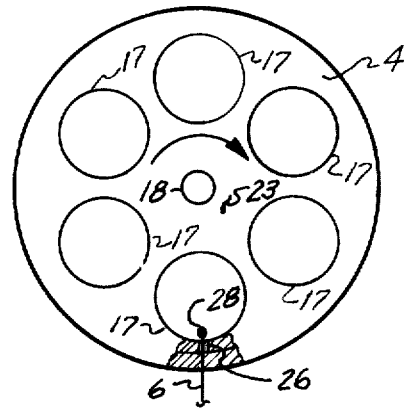
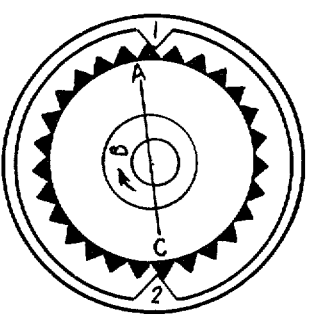
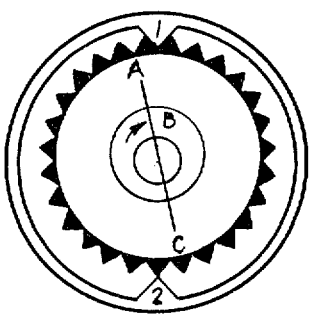

3,888,011

MEASURING DEVICES AND METHODS OF MAKING AND USING THE SAME

BACKGROUND OF THE INVENTION

Although not by way of limitation, it is contemplated that the device described herein will be used by fishermen as a depth measurement tool.

Devices presently available for this purpose are usually highly sophisticated and involve complicated and expensive components. Illustrative of this point are the usual sonar type devices which are not only expensive initially but are difficult and expensive to maintain for the casual fisherman.

SUMMARY OF THE INVENTION

In the present invention a device is contemplated which includes essentially a housing, reel, eccentric hub, gear and line.

It is a primary object of the invention to provide such a device with a minimum of parts, which is simple to assemble or disassemble and readily lends itself to economical manufacturing.

A further object of the invention is to provide such a device which when the line is pulled out of the housing an indication is given on the housing of the length of line disbursed.

A further object of the invention is to provide such a device wherein the line is disposed about a reel mounted within the housing and the reel is coupled by means of a rotation divider to indicating means on the housing.

A further object of the invention is to provide such a device wherein the rotation divider comprises an eccentric hub mounted on said reel and disposed within a center hold of a toothed wheel or gear which meshes with teeth disposed within the chamber.

With the above primary and other incidental objects in view, which will appear more fully in the specification of the invention which is provided herein the invention to be protected by Letters Patent consists of the features of construction, the parts and combinations thereof, and the mode of operation hereinafter described or illustrated in the accompanying drawings or their equivalents.

BRIEF DESCRIPTION OF THE DRAWINGS

Referring to the drawings wherein is illustrated a preferred but not necessarily only form of embodiment of the invention.

FIG. 1 is an exploded perspective view of a measuring device constructed in accordance with and embodying the present invention.

FIG. 2 is an elevation view of a housing used in the device shown in FIG. 1.

FIG. 3 is an elevation view of a housing used in the device shown in FIG. 1.

FIG. 4a through 4b is a functional drawing of the rotation multiplier constructed in accordance with and embodying the present invention.

DETAILED DESCRIPTION OF THE INVENTION

Referring now to the drawings in more detail and in particular to FIG. 1, the measuring device, 1, is shown in an exploded view clearly showing the housing, 2, gear, 3, reel, 4, provided with eccentric hub, 5, line, 6, knob, 8, and weight, 7.

FIG. 2 is an elevation view of housing, 2, illustrating hub, 9, upon which reel, 4, rotates, and teeth, 10, disposed 180° apart within chamber, 11, in housing, 2. FIG. 2 also illustrates port, 12, through which indicia, 13, on gear, 3, are viewed. Indicia, 13, are shown in FIG. 1. Also shown in FIGS. 1 and 2 is boss, 14, on hub, 9, which extends through reel, 4, and is provided with threaded hole, 15, into which is inserted the threaded portion, 16, of knob, 8.

Shown in FIGS. 1 and 3 is reel, 4, which is provided with recesses, 17, which reduce inertia of reel, 4, and may be used for winding and rewinding of line, 6. Boss, 14, interfaces with knob, 8, via hole, 18, provided in reel, 4.

Shown in FIG. 1 is gear, 3, provided with concentric hole, 19, which fits over eccentric hub, 5, on reel, 4, and is disposed about hub, 9, on housing, 2, and teeth, 20, extending about the periphery of gear, 3, and indicia, 13, on gear, 3.

Functional operation of divice, 1, is shown in FIG. 4a through e. In FIG. 4a is a typical starting position of gear, 3, showing the relative positions of gear, 3, to teeth, 10, and hub, 5. As hub, 5, rotates in clockwise direction, FIGS. 4b through 4e show the relative positions of gear, 3, teeth, 10, and hub, 5, at 90° intervals. FIG. 4e illustrates that gear, 3, is rotated the angular rotation corresponding one tooth, 20, for each 360° rotation of hub, 5. Each rotation of hub, 5, corresponds to one rotation of reel, 4. The indicia, 1, 2, A, B, and C used in FIG. 4 is for ease of following the operation of device, 1.

In the embodiment shown the number of teeth, 20, on gear, 3, is 45 so that by providing a reel, 4, with a groove, 21, which has a mean average circumference of 1 foot, the device will measure from 0 to 45 feet of line, 6. Line, 6, may be constructed of wire, tape, string, conventional fishing line or the like. Knob, 8, when threaded into hole, 15, keeps the device, 1, together. Also, by adjusting the pressure of shoulder, 22, of knob, 8, on surface, 23, of reel, 4, the amount of "drag" on line, 6, is thereby controlled. Plug, 24, may be used to close hole, 25, in housing, 2, which may result from a particular manufacture of housing, 2. Also shown in FIGS. 2 and 3 is hole, 26, in reel, 4, and hole, 27, in housing, 2, which allows line, 6, to be extended from reel, 4, externally of housing, 2, to weight, 7. Line retainer, 28, prevents line, 6, from parting from reel, 4.

While I have illustrated and described the preferred embodiments of my invention, it is to be understood that changes and modifications in the form, construction, arrangement and combination of the parts and steps of the measuring device and methods of making and using the same may be substituted for those herein shown and described without departing from the nature and principle of my invention.

Having thus described my invention what I claim as new and desire to secure by United States Letters Patent is:

1. A measuring device comprising,
   housing means, said housing means provided with a chamber therein,
   a pair of sprocket teeth operably mounted in said chamber,
   a first hub means operably mounted on said housing means, said first hub means disposed within said chamber, reel means rotatably mounted on said first hub means, measuring line means operably secured to said reel means, second hub means mounted on said reel means, said second hub means disposed eccentric to the axis of rotation of said reel means sprocket means rotatably mounted on said second hub means and communicating with said sprocket teeth, securing means operably coupling said reel means to said housing means, sprocket means being provided with measuring indicia and said housing being provided with an indicia viewing port, through which said indicia are visible.

2. A measuring device as in claim 1 wherein said securing means is provided with drag adjustment means.

3. A measuring device as in claim 1 wherein said reel means is provided with a plurality of recesses in the outboard surface thereof.

4. A rotation divided comprising, housing means, said housing means provided with a chamber therein, a pair of sprocket teeth operably mounted in said chamber and on said housing, first hub means operably mounted on said housing means, said first hub means disposed within said chamber, reel means rotatably mounted on said first hub means, measuring line means operably secured to said reel means, second hub means mounted on said reel means, said second hub means disposed eccentric to the axis of rotation of said reel means sprocket means rotatably mounted on said second hub means and communicating with said sprocket teeth, securing means operably coupling said reel means to said housing means, said sprocket means being provided with measuring indicia and said housing being provided with an indicia viewing port, through which said indicia are visible.

* * * * *